United States Patent [19]

Jaffe et al.

[11] Patent Number: 4,895,949

[45] Date of Patent: Jan. 23, 1990

[54] PROCESS FOR PREPARATION OF QUINACRIDONE SOLID SOLUTIONS

[75] Inventors: Edward E. Jaffe; Johannes Pfenninger, both of Wilmington, Del.

[73] Assignee: Ciba-Geigy Corporation, Ardsley, N.Y.

[21] Appl. No.: 209,260

[22] Filed: Jun. 20, 1988

[51] Int. Cl.$^4$ ............................................. C09B 48/00
[52] U.S. Cl. ........................................ 546/56; 546/49
[58] Field of Search .................... 546/56, 49; 106/495, 106/497

[56] References Cited

U.S. PATENT DOCUMENTS

| | | | |
|---|---|---|---|
| 3,298,827 | 1/1967 | Hanke et al. | 546/56 |
| 4,298,398 | 11/1981 | Fitzgerald | 106/497 |
| 4,541,872 | 9/1985 | Jaffe | 546/56 |
| 4,758,665 | 7/1988 | Spietschka | 546/49 |
| 4,760,144 | 7/1988 | Jaffe | 546/49 |
| 4,801,702 | 1/1989 | Bäbler | 546/56 |
| 4,810,304 | 3/1989 | Jaffe et al. | 106/495 |

*Primary Examiner*—Donald G. Daus
*Attorney, Agent, or Firm*—Harry Falber

[57] ABSTRACT

A process for preparing pigmentary solid solutions of at least one quinacridone derivative and the parent quinacridone compound which comprises milling the starting quinacridone materials at ambient or near ambient temperatures in the presence of an alcohol and a base.

17 Claims, No Drawings

PROCESS FOR PREPARATION OF QUINACRIDONE SOLID SOLUTIONS

The quinacridone series of compounds and their pigmentary properties are well known, having been described in numerous patents and in the technical literature. Likewise, solid solutions of quinacridone derivatives are known in the art, such solid solutions being prepared to achieve good pigmentary properties as well as associated improved lightfastness and thermal stability. The solid solutions are characterized by X-ray patterns that can be clearly differentiated from the pattern of a physical mixture of the same components in similar concentrations.

Reference is made to U.S. Pat. No. 3,160,510 for a discussion of quinacridone solid solutions. The preparative process disclosed therein involves forming a dimethylformamide suspension of the materials, heating to boil and maintaining the system under reflux for at least one hour. U.S. Pat. No. 3,607,336 discloses a process whereby the crude components are dissolved in concentrated sulfuric acid, reprecipitated by drowning in highly turbulent water, followed by a heating period in dilute sulfuric acid. Additional solid solutions are set forth in U.S. Pat. No. 3,681,100 and U.S. Pat. No. 3,686,009. Since these procedures generally comprise operations with many steps conducted at elevated temperatures in acidic environments, simpler, more economical, ambient temperature approaches would be desirable.

Accordingly, it is the primary object of this invention to provide an improved method for the preparation of quinacridone solid solutions.

Various other objects and benefits of this invention will become apparent from the following descriptions thereof.

It has now been surprisingly discovered that quinacridone solid solutions of pigmentary quality and improved crystallinity (judged by X-ray diffraction patterns) can be readily prepared by milling the crude quinacridone precursor materials in an alcohol and in the presence of a base. The process shows great flexibility. A substantial variety of solid solutions can be prepared differing in composition, concentration of components and particle size. Thus, pigments with high opacity or counterparts with intermediate or high transparency can be produced by the process or a modified version thereof. Crude, premilled or acid pasted quinacridone powders are available for use as starting materials in the process. Of particular merit, the process can be conducted at ambient or near ambient temperatures in a milling operation having one or only a limited number of steps which allows for the formation of the solid solution. The latter aspects are in distinct contrast to the aforementioned prior art approaches which generally require elevated temperatures and operations with several distinct steps. In addition, the appropriate particle size growth permits direct isolation of the pigmentary product from the mill slurry. Finally, the resulting solid solutions exhibit excellent performance characteristics. They are fast to light and weathering and resistant to attack by solvents, permitting their use in a variety of finishes and particularly automotive finishes. They also exhibit superior heat stability, permitting their use in a variety of polymeric materials.

The solid solution components may be quinacridone or its derivatives including among others 4,11-dichloroquinacridone, 2,9-dichloroquinacridone, 4,11-difluoroquinacridone, 2,9-difluoroquinacridone, 2,9-dimethylquinacridone, and combinations thereof. Although the descriptions herein will focus on the above noted materials, it is intended that the instant invention have applicability to a broad range of quinacridone compounds.

By way of illustration, applicable quinacridones may be linear quinacridones of the formula

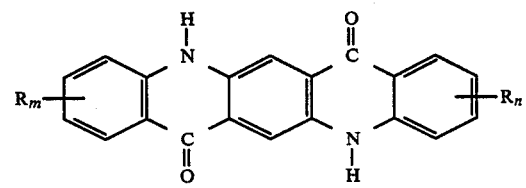

wherein R is independently fluoro, chloro, bromo, lower alkyl or lower alkoxy, and m and n independently are 0–2; and isoquinacridones of the formula

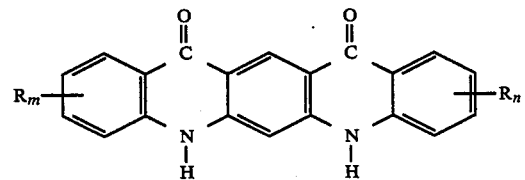

wherein R, m and n are as previously defined.

Some of the outstanding series of solid solutions which can be prepared by the process of this invention are set forth below:

(1) Solid solutions containing components from the group consisting of unsubstituted quinacridone and 4,11-disubstituted quinacridones wherein both substituents are of the same atom or radical selected from the group consisting of F, Cl, Br, $CH_3$, and $OCH_3$.

(2) Solid solutions containing components from the group consisting of unsubstituted quinacridone and 2,9-disubstituted quinacridones wherein both substituents are of the same atom or radical selected from the group consisting of F, Cl, Br, $CH_3$, and $OCH_3$.

(3) Solid solutions containing as components isoquinacridone and/or symmetrically disubstituted isoquinacridones wherein both substituents are of the same atom or radical selected from the group consisting of F, Cl, Br, $CH_3$, and $OCH_3$, usually in combination with linear quinacridones.

Particularly valuable solid solution pigments have been obtained consisting of 60% quinacridone and 40% 2,9-dichloroquinacridone (brilliant magenta) or 60% quinacridone and 40% 4,11-dichloroquinacridone (brilliant scarlet). If desired, the concentration of quinacridone can be decreased to, for example, 10% as shown in the solid solution consisting of 10% quinacridone and 90% 2,9-dichloroquinacridone. These examples are representative of a vast field of solid solutions accessible by the process of this invention.

The process is especially suitable for preparing opaque scarlet solid solutions consisting of quinacridone and 4,11-dichloroquinacridone. Thus, an attractive solid solution can be obtained from the two crudes by a single step milling of 60% quinacridone and 40% 4,11-dichloroquinacridone. By inclusion of a particle size inhibitor, as described hereinafter, a transparent counterpart can be prepared. If desired, the composition can be changed to 60% 4,11-dichloroquinacridone and 40% quinacridone thus shifting the color to shorter wavelength. In general, the weight ratio of quinacridone: quinacridone derivative will range from 95:5 to 5:95, and preferably 75:25 to 25:75.

The instant process generally proceeds by charging the crude, premilled or acid pasted quinacridones, the alcohol and the base to an appropriate mill, introducing the milling elements, milling the system at a temperature of 20° to 40° C. (i.e. ambient or near ambient temperatures), preferably room temperature, for a period of about 24 to 96 hours and isolating the resulting quinacridone solid solution. Applicable alcohols include low boiling alcohols such as methanol, ethanol, butanol and pentanol; and glycols such as ethylene glycol. The alcohol must be stable in the presence of base. Methanol and ethanol are preferred. Applicable inorganic and organic bases include alkali metal hydroxides such as potassium hydroxide, sodium hydroxide, and lithium hydroxide, and quaternary ammonium hydroxides such as benzyltrimethylammonium hydroxide. Sodium and potassium hydroxide are preferred.

Surprisingly, the milling procedure of this invention allows the formation of highly crystalline solid solutions of quinacridones in pigmentary form at room temperature, contrary to the cited state of the art procedures that require treatment at elevated temperatures. Correspondingly, as the final pigment particles are generally formed during the milling, no additional heating period is essential.

As noted above, crude pigments or subpigmentary powders obtained, e.g., through premilling or acid pasting of crude quinacridones, can be used in the milling procedure of this invention. Premilling operations are known and, as used in the invention, refer to milling in the complete absence of liquids, or if liquids are used, such as a phase directing solvent or a surface active agent, they are present in such small amounts (maximum of about 10% by weight of pigment) or of such a nature that the pigment retains the characteristics of a powder. The premilling is optionally carried out in the presence of a small amount, 10% or less, of a salt such as anhydrous sodium sulfate to avoid possible explosivity of the generated mill powder. The premilling can be carried out with a variety of milling media, such as steel balls and nails, steel shot or ceramic balls or beads. If premilling is carried out with steel milling media, it is desirable to extract the pigment slurry at the end of the milling procedure of this invention with dilute mineral acid to remove any metal that wears off from the media during the milling operation.

Acid pasting refers to dissolving the crude pigments in concentrated sulfuric acid and subsequently generating subpigmentary particles by addition of the pigment solution to water directly or under high turbulence conditions.

For the basified alcohol milling procedure of this invention, a variety of milling media are suitable, e.g., steel shot or ceramic beads. Of the latter, different sizes and compositions are available. Grinding beads of 1.6 to 2.5 mm. or 2.5 to 3.15 mm size made from crystalline zirconia phase and amorphous silica phase by fusion of the oxides are particularly suitable. Zirconium oxide beads containing small amounts of magnesium oxide are similarly useful. As mentioned above, if steel milling media are used, an acid extraction of the pigment slurry after milling is desirable.

The concentrations of alcohol and base are selected to optimize pigmentary properties. The alcohol is generally present in an amount ranging from 5 to 25 times the weight of pigment, and preferably 12 to 20 times. Correspondingly, the base is generally present as an aqueous solution (on a base content) in an amount ranging from 0.5 to 10.0%, by weight of alcohol, and preferably 1.0–5.0%.

In the absence of an appropriate amount of base, particle growth is minimal and the formation of solid solutions is incomplete. At the desirable base concentration range, there is no visible formation of the quinacridone potassium, sodium or quaternary ammonium salt, which when formed can be easily recognized due to its distinct blue color. However, during the milling operation, as new surfaces are generated, the mechanism of particle growth is believed to involve formation of a very small concentration of the salt, which is more soluble in alcohol than quinacridone itself and thus subject to particle growth followed by alcoholysis to the pigment. This dynamic particle ripening system eventually permits total solid solution formation and particle growth to the desirable equilibrium size.

It is possible to control the particle size in the basified alcohol milling by addition of growth inhibiting agents. Thus, the particle size can be varied in a broad range $(0.01\mu–0.8\mu)$ from highly transparent to opaque pigments. Suitable for this purpose are, e.g. 2-phthalimidomethylquinacridone, the salts of quinacridone sulfonic acid and other similar derivatives. The growth inhibiting agent is generally added in amounts of 0.5 to 10%, based on the weight of pigment, and preferably 1 to 5%. 2-Phthalimidomethylquinacridone (I) of the formula

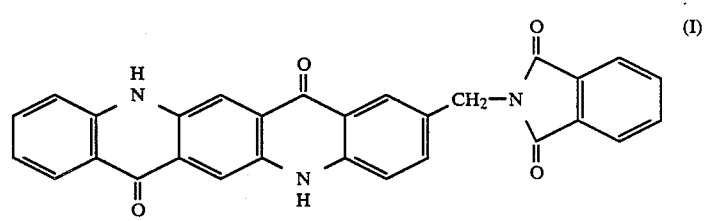

is especially suitable as a growth controlling agent under basified alcohol milling conditions, since in the alkaline medium it undergoes ring opening to the salt (II) of the following amido carboxylic acid:

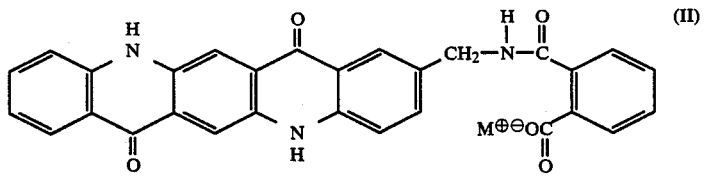

wherein M+ is Li+, Na+, K+ or NR4+ which is believed to be a more potent growth inhibitor than the ring closed "imid" form (I) present under acidic or neutral conditions.

If desired, various surfactants or extenders can be introduced in the baified alcohol milling step, provided the additives are not inactivated by the basic medium. Simple addition of anionic (subject to salt formation), cationic or nonionic surfactants to the liquid milling operation, assuming the materials are not water soluble, will cause them to come out in a uniform manner on the surface of the pigment during alcohol removal and, consequently, frequently alter the pigment properties.

Since the nearly ultimate particle size is generated in the liquid milling step, the product can be isolated directly from the mill slurry after milling media separation, provided no acid extraction is required. However, the pigment is best isolated after alcohol removal by distillation. After the milling media have been separated and washed free of pigment, the resulting pigment slurry is either steam distilled, or diluted with water and the alcohol distilled with external heat until the residue is essentially alcohol free. The alcohol is thus recovered and the pigment isolated from a nonflammable slurry by filtration. After isolation, the pigment is washed free of base with water. The resulting pigments show excellent crystallinity by X-ray diffraction, generally surpassing counterparts prepared by state of the art procedures.

Like many other pigments, the products of the invention can be advantageously surface treated by known methods to improve their performance in a variety of automotive and other finish systems. Additives which serve to lessen or avoid flocculation and increase pigment dispersion stability can be advantageously used. When so treated, the pigments show outstanding performance on their own or as blending agents in a variety of systems, e.g. automotive finishes, such as acrylics, alkyds, polyester and other systems. 2-Phthalimidomethylquinacridone, quinacridonesulfonic acid, or other similar derivatives can serve as additive antiflocculating agents. In some systems, the addition of polymeric dispersants further improves the performance of these pigments.

Pigmented systems which contain the pigments as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigments may also be present in synthetic, semi-synthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example, organic or inorganic pigments.

The mixtures of substances which contain as active coloring ingredient the pigments of this invention, may be of solid, elastic, pasty, viscous, mobile or thixotropic consistency. They may be obtained by conventional methods. Aqueous pastes may be obtained for example by stirring the pigments into water, possibly with the addition of a wetting or dispersing agent or by stirring or kneading the pigments into a dispersing agent in the presence of water and possibly of organic solvents or oils. These pastes may for example be used for the production of flush pastes, printing colors, distempers, plastic dispersions and spinning solutions. The pigments may also be introduced by stirring, rolling, kneading or grinding into water, organic solvents, non-drying oils, drying oils, lacquers, varnishes, plastics or rubber. Finally, it is also possible to work up the pigments by dry mixing with organic or inorganic masses, granulates, fibrous materials, powders and other pigments, to form mixtures of substances.

In addition to their high crystallinity, good general fastness, such as fastness to light and weathering, and solvent and softener resistance, the pigments are also characterized by superior resistance to high temperatures. For example, the thermal behavior of the pigments makes it possible to work them into high and low density polyethylene or polypropylene, without the shade of color being dulled by the effect of the temperature during processing.

The following examples further illustrate the embodiments of this invention. In these examples, all parts given are by weight unless otherwise indicated.

EXAMPLE 1

This example describes the preparation of a solid solution of quinacridone and 4,11-dichloroquinacridone.

A 2.84 liter laboratory scale ball mill is charged with 2500 parts ceramic beads ranging in size from 1.6 to 2.5 mm and consisting on average of about 69% $ZrO_2$ and 31% $SiO_2$, 30.5 parts crude gamma quinacridone, 19.5 parts crude 4,11-dichloroquinacridone, 791 parts methanol and 75 parts 44%, by weight, aqueous potassium hydroxide. The mill is rotated for 72 hours at about 30° C. at about 74% of the critical speed (critical speed is the speed at which the centrifugal force overcomes the force of gravity so that the grinding elements are retained against the outer wall of the mill).

The pigment slurry is separated from the beads and the latter washed with methanol. The combined slurries are steam distilled until the temperature of the aqueous pigment suspension reaches 95° C. The temperature is maintained for about 10 minutes, the pigment isolated by filtration, washed free of base with water and dried. Forty eight and half parts of a pigment with a surface area of 25.6 m²/g are recovered. Its X-ray pattern shows a high degree of crystallinity and is identical with prior solid solutions of essentially the same composition.

Tinctorial qualities are determined utilizing rubouts in lithographic varnish prepared with a Hoover Muller. The apparatus is equipped with a ⅛ HP 110-22 V, 60 cycle motor and two glass plates. The Muller can be adjusted to stop after 25, 50, 75, or 100 revolutions with 50 revolutions being considered normal. Three weights are used which apply 150 pounds pressure between the plates. In each case, 0.6 parts of dry pigment and 1.2 parts of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 parts) and a zinc oxide paste dispersion (10 parts) are weighed accurately and mixed with a spatula on a polished glass plate. The resulting extensions, referred to as tints, are drawn down versus an appropriate control prepared in an identical manner. Visual comparison of both the masstones and tints are made wet and after drying at room temperature for several days.

When the pigment of this Example is rubbed out in a lithographic varnish, it shows an intense opaque masstone highly desirable for styling opaque automotive finishes.

A virtually identical solid solution product, confirmed by X-ray diffraction, is obtained by filtering and washing the pigment slurry after separation from the milling media without the indicated heat treatment. This thus supports the position that an isolation procedure (e.g. steam distillation, optional acid extraction) is not essential for solid solution formation.

When the same milling procedure in methanol is performed without the addition of base, the isolated product is clearly different, displaying a mixture of phases of the starting materials in the X-ray diffraction pattern and by rubout being darker in masstone and bluer in tint.

When the crude pigment, methanol and potassium hydroxide in the same ratios as described above are heated at reflux temperature for several hours without milling, no solid solution is obtained and the product is by rubout darker in masstone and bluer in tint.

EXAMPLE 2

This example illustrates the incorporation of the product of Example 1 into an alkyd paint system and into polyolefins.

A mixture of 25 parts pigment, 30.77 parts binder and 44.23 parts solvent are dispersed in a quart glass jar containing 1960 parts 5/32" steel rods for 64 hours on a roller gear bed. The millbase is let down in portions with 133.3 parts binder and 67.87 parts solvent and separated from the milling media. The viscosity of the paint is adjusted by solvent addition (20–23 sec., #4 Ford cup). The paint is sprayed onto an aluminum panel pretreated with a gray acrylic primer and subsequently baked at 121° C. for 30 minutes to give an intense opaque finish with excellent durability on long term outdoor exposure.

When 4,11-dichloroquinacridone is physically mixed with quinacridone in the same proportions as the pigment of Example 1 and is subjected to the same incorporation and exposure procedures, significant color degradation is observed.

The pigment of Example 1 is found to be heat stable up to 300° C. in polypropylene: A compound is prepared by dry tumbling the pigment in the presence of polypropylene polymer granules followed by two extrusion/granulation operations at 200° C. The heat stability is determined by comparison of chips injection molded at different temperatures. The pigment of Example 1 can also be incorporated in high density polyethylene (HDPE) in a similar fashion showing excellent dimensional stability, unlike products of the same composition prepared by other processes.

EXAMPLE 3

This example describes the preparation of a small particle size crystalline quinacridone/4,11-dichloroquinacridone solid solution.

A semi-works scale ball mill is charged with 454,000 parts of "Cly-Pebs" steel cylinders approximately ½ inch (0.0127 m) in diameter and ½ inch (0.0127 m) in length, 45,400 parts of "twenty penny" 4 inch (0.1 m) nails, 10,896 parts crude gamma quinacridone, 7,264 parts crude 4,11-dichloroquinacridone and 2,270 parts anhydrous sodium sulfate. The mill is rotated at 40 rpm which is about 74% of the critical speed for 50 hours at 47°–48° C. The mill is opened and its contents discharged through a screen which retains the "Cyl-Pebs" and nails.

Thereafter, 132 parts of the resulting mill powder are charged into a 2.84 liter mill containing 4800 parts of ⅛ inch (0.0032 m) steel shot, 791 parts methanol, 75 parts 50% sodium hydroxide and 2.4 parts of 2-phthalimidomethylquinacridone. The mill is rotated for 72 hours at about 30° C. and 68 rpm. The mill is discharged, the milling media separated from the slurry and the beads washed with methanol. The basic slurry is transferred to a 4-neck flask equipped with a stirrer, thermometer, Dean Stark tube and condenser. Steam is passed through the slurry and methanol together with some water is distilled off until the temperature reaches 95° C. The temperature is maintained for about 10 minutes. The slurry is cooled to 80° C., acidified with dilute sulfuric acid to pH=1.5 and stirred at 80°–85° C. for 60 minutes. Then, 24 parts of hydrated aluminum sulfate are added to the slurry, followed by addition over 30 minutes in a uniform manner of an aqueous slurry containing 3.14 parts quinacridone-2-sulfonic acid. After completion of the addition, the temperature is maintained at 80°–85° C. for 30 minutes. The pigment is isolated by filtration and washed with hot water until free of acid. After drying at 80° C., 111.4 parts of pigment with a surface area of 66.9 m²/g are isolated. The X-ray pattern of this product in terms of band positions is identical with the solid solution of the same composition described in Example 1.

By rubout in a lithographic varnish, the pigment shows a dark transparent masstone and an intense scarlet color on extension with zinc oxide.

When the 2-phthalimidomethylquinacridone is omitted in the alcohol milling step, a relatively large particle size product with a surface area of 31.2 m²/g and a light and opaque masstone is obtained. When, in addition, the pigment slurry is heated for 3 hours at reflux temperature prior to the steam distillation, a slightly lighter masstone pigment with a surface area of 27.6 m²/g is obtained, indicating that slight particle growth is occurring upon reflux in the alkaline alcohol medium.

EXAMPLE 4

This example describes the preparation of a relatively opaque solid solution of 60% gamma quinacridone and 40% 2,9-dichloroquinacridone.

A laboratory scale mill is charged with 1500 parts steel balls (diameter ½ inch=0.0127 m), 150 parts roofing nails, 30 parts crude gamma quinacridone, 20 parts crude 2,9-dichloroquinacridone and 5 parts anhydrous sodium sulfate. The mill is rotated at approximately 75% of its critical speed for 24 hours. The balls and nails are separated with a screen and the dry mill powder recovered.

A 236 ml mill is charged with 300 parts ceramic beads (see Example 1), 6 parts of the above mill powder, 79 parts methanol and 5.4 parts 50% aqueous sodium hydroxide. The mill is rotated for 72 hours at about 30° C. and at about 74% of the critical speed. The pigment slurry is worked up as described in Example 1 and 4.2 parts pigment of high crystallinity (as judged by X-ray diffraction pattern) and a surface area of 48.3 m$^2$/g are isolated.

A virtually identical product, showing complete solid solution formation, is obtained without heat treatment by merely filtering the pigment slurry and washing the pigment after separation from the milling media.

By rubout in a lithographic varnish, these pigments show a light masstone and an intense bluish-red tint.

EXAMPLE 5

This example describes the preparation of a small particle size highly crystalline quinacridone/2,9-dichloroquinacridone solid solution.

A mixture of 60% crude gamma quinacridone and 40% 2,9-dichloroquinacridone in the presence of sodium sulfate is dry milled as described in Example 3. Thereafter, 100 parts of the resulting mill powder are charged into a 2.84 liter mill containing 4800 parts of steel shot, 791 parts methanol, 75 parts 50% sodium hydroxide and 4.5 parts of 2-phthalimidomethylquinacridone. Milling and work up of the pigment slurry are performed as described in Example 3, except that the pigment surface treatment is proportional to the amount of treated pigment. After drying, 89 parts of pigment are recovered.

Its X-ray pattern shows it to be a complete solid solution of good crystallinity and a surface area of 78.6 m$^2$/g. By rubout in a lithographic varnish, it is a transparent deep magenta in masstone and an attractive, relatively strong bluish-red on extension with zinc oxide.

When the 2-phthalimidomethylquinacridone is omitted in the alcohol milling step, a relatively opaque product is obtained which shows a surface area of 49.8 m$^2$/g. It is light in masstone and weaker and relatively yellower in zinc oxide extension vs. the higher surface area pigment. The product is essentially equal to the product of Example 4.

EXAMPLE 6

This example describes the preparation of a quinacridone/2,9-dimethylquinacridone solid solution of relatively large particle size.

A laboratory scale mill is charged with 150 parts steel balls (diameter ½ inch=0.0127 m), 150 parts roofing nails, 30 parts crude gamma quinacridone, 30 parts crude 2,9-dimethylquinacridone and 5 parts anhydrous sodium sulfate. The mill is rotated at about 75% of its critical speed for 48 hours. The balls and nails are separated with a screen and the dry mill powder is recovered.

50 Parts of the millpowder are introduced into a 2.84 liter laboratory scale mill containing 2500 parts ceramic beads ranging in size from 1.6 to 2.5 mm, 791 parts methanol and 18.8 parts 50% aqueous sodium hydroxide. The mill is rotated at about 30° C. and about 74% of the critical speed for 72 hours. The mill is discharged onto a screen which retains the ceramic beads. The beads are washed with 632 parts methanol, so that essentially all of the pigment is collected as a slurry. The basic slurry is transferred to a 4-neck flask equipped with a stirrer, thermometer, Dean Stark tube and condenser. Steam is passed through the slurry and methanol together with some water is distilled off until the temperature reaches 95° C.

The slurry is cooled to 80° C. and acidified with 20% sulfuric acid to pH=1.5. The slurry is heated to about 95° C., kept at 95° C. for one hour and the product is isolated by filtration and washed with hot water until free of acid. The product is dried at 80° C. to yield 42.8 parts of a product with a relatively light, opaque masstone, determined by rubout. The X-ray diffraction pattern of the product indicates a solid solution with a high degree of crystallinity.

EXAMPLE 7

This example describes the preparation of a solid solution of 90% 2,9-dichloroquinacridone and 10% quinacridone.

A mixture of 90% crude 2,9-dichloroquinacridone and 10% crude gamma quinacridone is dry milled in presence of sodium sulfate as described in Example 4. 50 Parts of the mill powder are then charged into a 2.84 liter laboratory scale ball mill containing 2500 parts ceramic beads, 791 parts methanol and 75 parts 50% aqueous sodium hydroxide. Milling and work up are performed as described in Example 6, and 42.5 parts of a relatively opaque magenta pigment with a surface area of 59.0 m$^2$/g are isolated. The product has a well defined X-ray diffraction pattern, indicative of excellent crystallinity, with identical band positions as a commercial solid solution of the same composition.

EXAMPLE 8

This example shows the beneficial effect of surface treatment of an alcohol milled product on rheology of an alkyd paint dispersion and on the appearance of an automotive finish.

The product of Example 1 (91%, by weight) is copulverized with 3% phthalimidomethylquinacridone and 6% of a polymeric dispersant (derived from isolation of the dry polymer from DISPERBYK 160 from BYK-Chemie). When incorporated in an alkyd automotive paint system in a conventional manner, a significant improvement in viscosity of the dispersion and in gloss and distinctness of image (DOI) of the ultimate finish is obtained, compared with an untreated counterpart or a commerical product of a similar composition (RT-787-D CIBA-GEIGY Corporation).

|  | Viscosity in CPS* | Masstone** | |
| --- | --- | --- | --- |
|  |  | 20° Gloss | DOI |
| Commercial product | 3810 | 81 | 70 |
| Untreated sample | 720 | 82 | 00 |

| | Viscosity in CPS* | Masstone** | |
|---|---|---|---|
| | | 20° Gloss | DOI |
| Product of this example | 60 | 90 | 95 |

*Brookfield Digital Viscosimeter (Model RVTD) at 10 rpm at 23° C.
**Masstone paint panel (10 cm × 15 cm. 10 gauge aluminum, gray acrylic primed panel spray painted to visual hiding over a black and white checkerboard) is prepared and dried. 20° gloss is measured with a gloss meter Glossguard System 20/60/85 (Model G67526) and distinctness of image is measured utilizing a DOI meter from Paul Gardner Co., Inc.

Summarizing, it is seen that this invention provides an improved approach to the preparation of quinacridone solid solutions. Variations may be made in proportions, procedures and materials without departing from the scope of the invention as defined by the following claims.

What is claimed is:

1. A process for making a solid solution of at least two quinacridone compounds which consists essentially of milling the crude or subpigmentary quinacridone compounds at a temperature of 20°–40° C. in the presence of an amount 5–25 times the weight of the quinacridone compounds of a low boiling alkanol or glycol and 0.5–10.0%, by weight of said alkanol or glycol, of an alkali metal hydroxide or quaternary ammonium hydroxide, and isolating the resulting solid solution.

2. The process of claim 1, wherein said quinacridones correspond to the formulae

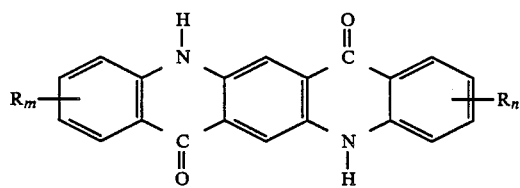

and

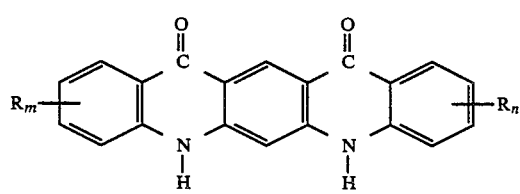

where R are independently F, Cl, Br, lower alkyl, or lower alkoxy and m and n are independently 0–2.

3. The process of claim 1, wherein one of said quinacridone compounds is linear quinacridone.

4. The process of claim 3, wherein said linear quinacridone constitutes from 5 to 95%, by weight, of said solid solution.

5. The process of claim 3, wherein said solid solution is composed of linear quinacridone and at least one 2,9-disubstituted or 4,11-disubstituted quinacridone wherein both substituents are the same and are F, Cl, Br, $CH_3$ or $OCH_3$.

6. The process of claim 5, wherein said solid solution comprises linear quinacridone and 4,11-dichloroquinacridone.

7. The process of claim 5, wherein said solid solution comprises linear quinacridone and 2,9-dichloroquinacridone.

8. The process of claim 5, wherein said solid solution comprises linear quinacridone and 2,9-dimethylquinacridone.

9. The process of claim 5, wherein said linear quinacridone and said disubstituted quinacridone are present in a weight ratio of 95:5 to 5:95.

10. The process of claim 1, wherein said alcohol is selected from the group consisting of methanol, ethanol, butanol, pentanol and ethylene glycol.

11. The process of claim 10, wherein said alcohol is methanol.

12. The process of claim 1, wherein said base is potassium hydroxide or sodium hydroxide.

13. The process of claim 1, wherein said alcohol is methanol and said base is potassium hydroxide or sodium hydroxide.

14. The process of claim 1, wherein said subpigmentary quinacridone compounds result from the dry premilling or acid pasting of crude quinacridone compounds.

15. The process of claim 1, wherein a growth inhibiting amount of a growth inhibiting quinacridone derivative is also present during said milling.

16. The process of claim 15, wherein said growth inhibiting quinacridone derivative is 2-phthalimidomethylquinacridone.

17. The process of claim 1, wherein the particle size range of said solid solution particles is 0.01 to 0.8 microns.

* * * * *